Sept. 13, 1960 K. G. ROBINSON 2,952,823
HIGH-FREQUENCY COAXIAL TRANSMISSION LINE ELBOW FITTINGS
Filed March 26, 1956
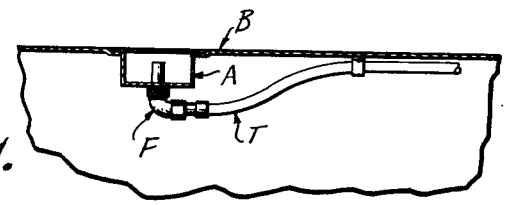
Fig. 1.
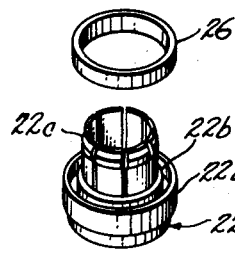
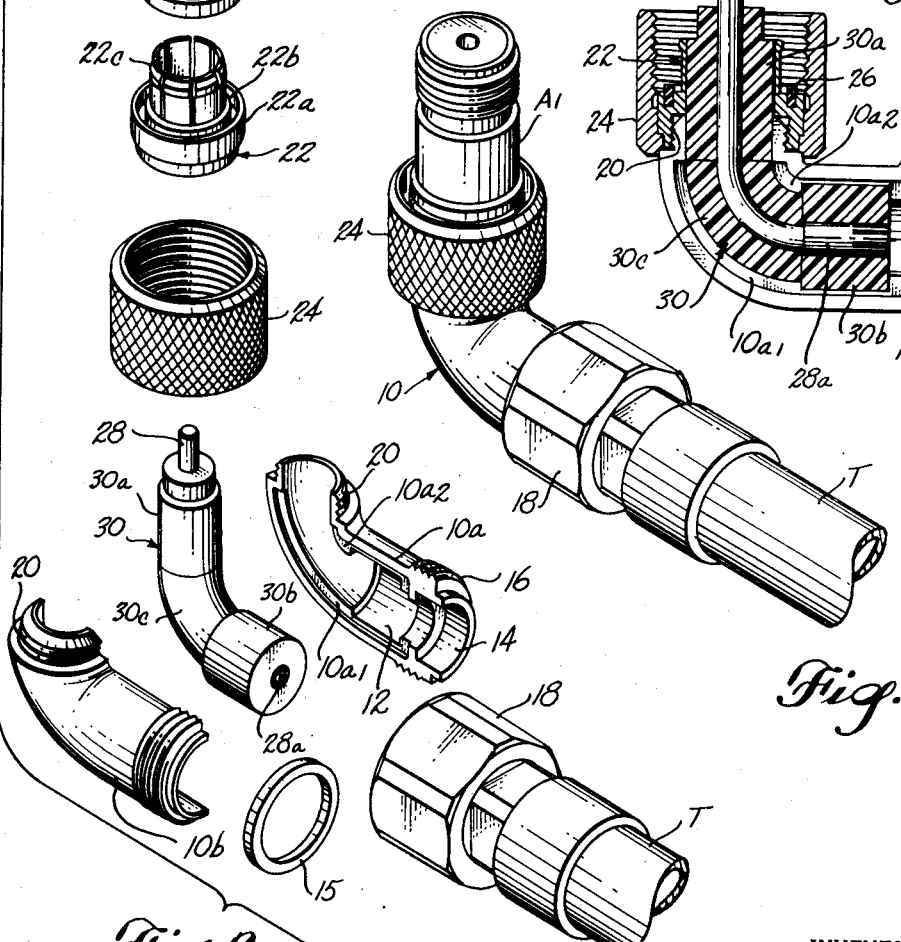
Fig. 2.
Fig. 3.
Fig. 4.
INVENTOR.
KEARNEY G. ROBINSON
BY
Reynolds, Beach & Christensen
ATTORNEYS

United States Patent Office 2,952,823
Patented Sept. 13, 1960

2,952,823

HIGH-FREQUENCY COAXIAL TRANSMISSION LINE ELBOW FITTINGS

Kearney G. Robinson, Bellevue, Wash., assignor to Boeing Airplane Company, Seattle, Wash., a corporation of Delaware Filed Mar. 26, 1956, Ser. No. 573,828

4 Claims. (Cl. 333—97)

This invention relates to improvements in apparatus for transmitting high-frequency electrical energy, and more particularly concerns an improved elbow fitting for high-frequency rigid coaxial transmission lines. A general object of the invention is the provision of such an elbow fitting which is capable of transmitting high-frequency electrical energy around a bend or corner of any selected angle with insignificant reflection of energy at or from the elbow and which is capable of such a result throughout a relatively wide band of frequencies and at power levels up to very high values. The invention is herein illustratively described by reference to the presently preferred form thereof; however, it will be recognized that certain modifications and changes therein may be made without departing from the essential or characterizing features involved.

The conventional rigid coaxial line elbow is formed by mitering the ends of the intersecting outer conductors and inner conductors and soldering or otherwise conductively joining these parts together to form a mitered joint. There is an abrupt change in the electric field configuration at this mitered joint which causes energy reflections. Impedance matching problems are created which, if ignored, result in loss of transmission efficiency; also they cause frequency skipping of the high-frequency energy generator, such as a klystron or magnetron connected to the transmission line. The problem is aggravated by the fact that the change of impedance at the mitered joint is different with different frequencies and is also affected by the dielectric material chosen to occupy the inter-conductor space. Another problem which may become serious at high voltages and high frequencies results from the dielectric stress concentrations at the mitered joint corner, promoting break-down. A mechanical problem is to form the mitered joint without a gap or crack between the interconnected conductors which would produce energy reflections.

Another object of the present invention is to provide a high frequency coaxial transmission line elbow fitting which overcomes the foregoing problems and further which is readily manufactured, assembled and removably connected and disconnected to and from mated coaxial line terminals.

Related objects include the provision of such an elbow fitting which is rugged, durable, capable of withstanding shock and vibration without altering the electrical characteristics of the elbow and which is capable of operating under widely variant atmospheric conditions such as those encountered in aircraft flight without electrical breakdown.

Further related objects include such an elbow fitting which requires no soldering or similar joining of current-carrying elements and which is readily disassembled to permit inspecting the body of electrical insulation therein for detecting possible flaws therein.

Still another object is such an elbow fitting which may be made with any desired angle of turn or bend without affecting the performance or other characteristics thereof, and without affecting the operation or impedance match of electrical components connected thereto.

As herein disclosed the invention comprises a high-frequency coaxial transmission line rigid elbow fitting including a tubular conductive shell of rigid elbow form comprising the transmission line fitting outer conductor, said shell being formed in two mutually complementary parts separable along a parting plane containing the longitudinal axis of the elbow. Preferably the two parts of the shell are held together detachably by removable collar means encircling the ends thereof. An elongated inner conductor of the same elbow form as the outer conductor is maintained centered therein by a body of insulation occupying the annular space therebetween. In its preferred and readily disassembled form the shell parts are not soldered together yet no appreciable energy losses or reflections are caused by the existence of any gap or crack at the joint therebetween inasmuch as the joint extends longitudinally of the conductor and the high-frequency currents flowing therein are directed only lengthwise thereof and therefore are not impeded by such a gap or crack. Moreover, a constant effective ratio of the inner diameter of the outer conductor and the diameter of the inner conductor is maintained along the length of the elbow fitting so as to avoid changes in characteristic impedance. All conducting surfaces of both inner and outer conductors being rounded and having no sharp corners, objectionable dielectric stress concentrations are minimized.

These and other features, objects and advantages of the invention will become more fully evident from the following detailed description thereof by reference to the preferred form shown in the accompanying drawings.

Figure 1 is a simplified side elevation view showing the elbow fitting installed in a representative aircraft antenna system.

Figure 2 is an exploded perspective view of the elbow fitting and associated parts.

Figure 3 is a longitudinal sectional view taken through the assembled fitting.

Figure 4 is a perspective view of the assembled fitting.

In Figure 1 the novel elbow fitting is shown connected to the end of a coaxial transmission line T extending along the top of an airplane fuselage B to the location of a flush-mounted antenna A, such as that disclosed and claimed in the copending patent application of Bystrom and Kelly, Serial No. 458,374, filed September 27, 1954, now Patent No. 2,817,086. The fitting in this instance is required to provide a rigid right-angle bend connection between the antenna and the transmission line. Low reflectivity of high-frequency energy is required of the fitting and the capacity to transmit energy at high power levels without danger of electrical break-down or loss of efficiency. Ease of connecting and disconnecting the fitting and of assembling and disassembling the same are further significant features thereof in such an application.

In the succeeding figures the fitting in its preferred form comprises an outer conductor or shell 10 of rigid elbow form consisting of two complemental elbow parts 10a and 10b. The term "elbow" as herein used connotes an abruptly curved bend or turn through an appreciable angle in the path of energy transmission, which angle in the example is a right angle, but which may be more or less than a right angle. It will be recognized that, within the scope of the invention, not only may the bend angle vary, but the lineal length of the fitting over which the selected bend angle is executed may also vary within the limiting requirement that the fitting serve as an elbow fitting within the customary connotations of that term in the art.

The mutually complementary tubular shell parts 10a and 10b are separable along a parting plane or interface which contains the curved longitudinal axis of Z—Z of the fitting, hence which represents the plane of curvature of the fitting. The part 10a, for example, has locating recesses 10a1 and 10a2 extending along the inside longitudinal edges thereof at the interface, which recesses are interengageable by complementary formed prominences or ribs (not shown) extending along the corresponding inner edges of the fitting 10b for initially establishing and thereafter assisting to maintain the two parts in positions of mutual registry. The inside diameter of the outer conductor 10 is uniform throughout its length except for the enlarged portion 12 which has a purpose to be explained, also except for the socket portion 14 at one end which is adapted to receive the mating end of the outer conductor of a transmission line T to be connected thereto. The exterior of the elbow fitting at the last-mentioned end thereof has a threaded portion 16 engageable by the interiorly threaded sleeve fitting 18 on the mating end of the transmission line T for securing such transmission line and fitting together. A ring or collar 15 is press fitted to the notched end of the fitting parts 10a and 10b to hold the same tightly together. The opposite end of the shell 10 also has an exteriorly threaded portion 20 engageable by the threaded interior of the terminal sleeve 22. The latter has an annular flange 22a which serves as a stop retaining the internally threaded coupling sleeve 24 on the end of the elbow fitting cap. The opposite end of terminal sleeve 22 has an annular slot 22b therein which receives a neoprene washer. The latter is compressible against the end face of an antenna element fitting A1 by threading the latter into the coupling sleeve 24, thereby establishing both an electrical connection and a moisture sealed connection. The multiple resilient prong formation 22c of the end of terminal sleeve 22 causes the same to fit snugly within the end of antenna fitting A1 to establish good electrical contact therewith around the entire periphery.

An elongated conductive rod 28 of substantially the same rigid elbow form as the shell 10 extends lengthwise centrally of the shell and forms the center conductor of the coaxial line elbow fitting. A body of insulation 30 substantially fills the space between the inner and outer conductors of the fitting for maintaining the same in co-axial relationship. Preferably this insulation material extends beyond the threaded end 20 whereas the inner conductor extends beyond the insulation so as to engage the inner conductor (not shown) of antenna coupling element A1. The opposite ends of the fitting inner conductor and body of insulation co-terminate an appreciable distance within the end of the shell, namely at the location of the end of the enlarged interior portion 12. The inner conductor 28 has an enlarged end portion 28a which is of end-opening tubular form. The tubular wall of the enlargement 28a is slitted lengthwise to form resilient gripping elements which tightly engage the end of the coaxial line inner conductor inserted into the tubular portion 28a. The enlargement of the inside diameter of the shell 10 as indicated at 12 is proportional to the enlargement of the inner conductor 28 at 28a and occurs over a corresponding portion of the length of each with the result that the characteristic impedance of the elbow fitting as a coaxial transmission line remains substantially constant throughout its entire length.

The grooving of the projecting end of the body of insulation 30 at 30a is for purposes of conformation to the internal configuration (not shown) of the particular antenna coupling A1 to which the fitting is connected in the example.

Preferably the body of insulation 30 is formed in three sections which are subsequently fused together into one solid unit. As representative materials, the end sections 30a and 30b may be formed of any suitable dielectric material, preferred of which is a material designated "Rexolite No. 1422" manufactured by the Rex Corporation, Rexolite Division, Hayward Road, West Acton, Massachusetts. Such material is particularly suitable for these end sections because of its dimensional stability with temperature change and machinability. The intermediate section 30c may be formed of polystyrene. In practice the end sections are machined to the correct shape, applied to the respective ends of the inner conductor 28 at the correct relative locations thereon, and the intermediate section 30c is then molded in place between the end sections in an injection molding machine. Rexolite and polystyrene being compatible plastics, the three sections are fused together in the injection molding process. The unit comprising the inner conductor surrounded by the body of insulation are formed separately from the shell or outer conductor 10 as indicated in Figure 2.

In aircraft antenna applications it is preferred that the outer and inner elbow conductors, also the associated sleeve fittings and other parts be die cast or machined from aluminum for achieving lightness of weight. These parts are preferably anodized for protection against corrosion. If desired, the conductive surfaces may be silver-plated. These and other design considerations are within the scope of the existing knowledge of the art.

In order to assemble the fitting parts shown in Figure 2 the two shell parts 10a and 10b are placed together around the central unit comprising the conductor 28 and the body of insulation 30. The holding collar 15 is heated and pressed over the notched end of the shell parts. The coupling sleeve 24 is slipped over the threaded portion 20 of the opposite end of the shell. The terminal sleeve 22 is then inserted into the coupling sleeve and threaded onto the shell portion 20. This locks the coupling sleeve 24 in place on the shell without preventing its rotation relative to the shell. With the neoprene washer 26 inserted into the groove 22b the antenna unit fitting A1 may then be engaged with the threads of the sleeve 24 by rotation of the latter in the correct sense. The end nut 18 of the transmission line T may then be threaded onto the threaded end 16 of the elbow fitting to complete the connection, at which time the inner conductor (not shown) of the transmission line T is, of course, pressed into the open end of the center conductor tubular enlargement 28a.

I claim as my invention:

1. A high-frequency coaxial transmission line rigid elbow fitting comprising, in combination, a round tubular conductive shell of rigid elbow form comprising the transmission line outer conductor of said elbow fitting, said tubular conductive shell being formed in at least two mutually complementary parts separable along parting lines extending longitudinally of said elbow, removable collar means encircling said tubular conductive shell and holding the complementary parts thereof together, said shell parts having complementally formed recesses and prominences which respectively interengage with the parts together to maintain precise registry of such parts, an elongated conductive member of rigid elbow form corresponding to the form of said shell and comprising the inner transmission line conductor of said elbow fitting, the outside diameter of said inner conductor being small in relation to the inside diameter of the shell, and solid insulation means continuously surrounding said elongated conductive member and conformed generally to the interior of said shell for closely-fitted reception therein to maintain said elongated conductive member coaxial with said shell.

2. The high-frequency transmission line rigid elbow fitting defined in claim 1, wherein the insulation means comprises a substantially continuous solid body of insulation substantially filling the space surrounding the inner conductor within the outer conductor and projecting endwise thereof beyond one end of said outer conductor, with said inner conductor projecting endwise beyond said end of such outer conductor, wherein the exterior of said end of such outer conductor is threaded, and wherein the collar means at said end of said fitting is threaded removably on said threaded outer conductor and projects endwise therefrom closely surrounding said projecting insulation over at least a portion of the projecting length thereof and is adapted for engagement with a coaxial transmission line terminus.

3. The high-frequency transmission line rigid elbow fitting defined in claim 1, wherein the opposite end of the outer conductor extends at least to the end of the body of insulation and the inner conductor, wherein such end of the inner conductor is enlarged and has an end-opening socket cavity therein to receive the end of a coaxial transmission line inner conductor, and wherein the inside diameter of the outer conductor is enlarged over the length portion thereof corresponding to the enlargement of said inner conductor, thereby to maintain substantially constant characteristic impedance along the length of said elbow.

4. The fitting defined in claim 1, wherein the complementally formed recesses and prominences have mutually engageable interface surface portions which extend longitudinally of the fitting substantially in a plane parallel to and offset from the parting plane of the outer conductor, such recesses and prominences terminating short of the respectively opposite ends of the outer conductor.

References Cited in the file of this patent

UNITED STATES PATENTS

| | | |
|---|---|---|
| 397,221 | Callender | Feb. 5, 1889 |
| 1,238,885 | Chmelar | Sept. 4, 1917 |
| 2,376,324 | Bogardus | May 22, 1945 |
| 2,413,298 | De Tar | Dec. 31, 1946 |
| 2,587,676 | Akers | Mar. 4, 1952 |
| 2,813,144 | Valach | Nov. 12, 1957 |

FOREIGN PATENTS

| | | |
|---|---|---|
| 141,100 | Australia | May 7, 1951 |
| 162,351 | Australia | Apr. 5, 1955 |